United States Patent [19]

Bourdon et al.

[11] Patent Number: 4,685,324
[45] Date of Patent: Aug. 11, 1987

[54] FLOWMETER HAVING A THERMORESISTANT ELEMENT AND ITS CALIBRATION PROCESS

[75] Inventors: Guy Bourdon, Le Chesnay; Dominique Lampin, Fontenay-aux-Roses, both of France

[73] Assignee: L'Air Liquide, Paris, France

[21] Appl. No.: 805,446

[22] Filed: Dec. 5, 1985

[30] Foreign Application Priority Data

Dec. 7, 1984 [FR] France .................................. 84 17702

[51] Int. Cl.⁴ .......................... G01F 1/68; G01F 25/00
[52] U.S. Cl. ............................................ 73/3; 73/204
[58] Field of Search ........................ 73/204, 3; 374/168

[56] References Cited

U.S. PATENT DOCUMENTS 3,449,953   6/1969   Craft ...................................... 73/204
4,523,462   6/1985   Kolodjsni .............................. 73/204

FOREIGN PATENT DOCUMENTS

3415507A1  11/1984  Fed. Rep. of Germany .
2080545     2/1982  United Kingdom .

OTHER PUBLICATIONS

Transactions of the Institute of Measurement and Control, vol. 3, No. 2, Jun. 1981, pp. 71–78, Dorking, G. B.; S. Marlowe, entitled "A Microprocessor-Based Automatic Polynominal Lineariser for Constant-Temperature Anemometry Systems".

Primary Examiner—Herbert Goldstein
Attorney, Agent, or Firm—Lee C. Robinson, Jr.

[57] ABSTRACT

The flowmeter comprises a variable gain amplifier (1) whose input is connected to ground through a resistor (4) of constant resistance of low value relative to the input impedance of the amplifier, the thermoresistant element (3) being connected between the input and the output of the variable gain amplifier (1) and means (2) being provided for adjusting the value of the gain of the amplifier in such manner as to obtain the desired value of the current in the thermoresistant element (3) corresponding to the constant temperature it is desired to obtain.

4 Claims, 2 Drawing Figures

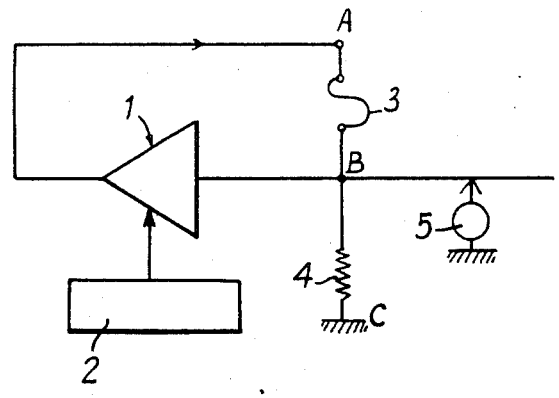
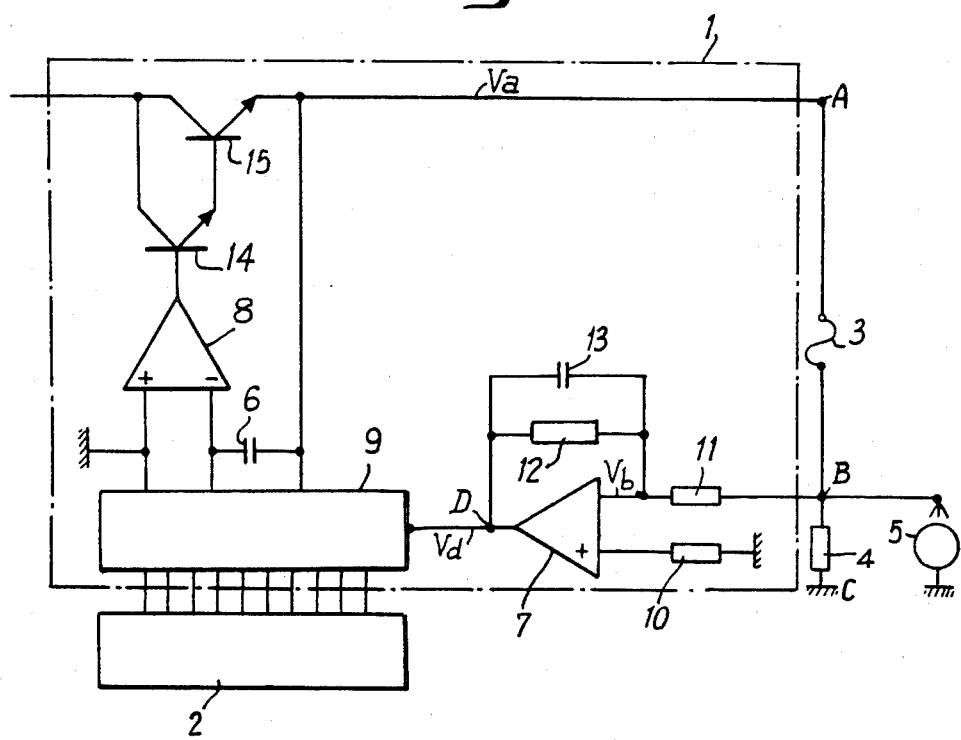

FLOWMETER HAVING A THERMORESISTANT ELEMENT AND ITS CALIBRATION PROCESS

The present invention relates to a flowmeter having a thermoresistant element and its calibration process.

In spirometry there are currently employed flowmeters having a thermoresistant element generally comprising a hot wire maintained at a constant temperature. In known flowmeters of this type the thermoresistant wire constitutes one of the branches of a Wheatstone bridge, and in order to maintain the temperature of this wire constant the bridge is maintained in equilibrium by means of a control. It can be shown that in respect of wires of the same nature and of the same diameter, the response of the flowmeter only depends on the temperature of the thermoresistant wire. Further, in respect of zero flow and a given orientation of the wire in space, the temperature of the latter only depends on the magnitude of the current passing therethrough. Consequently, the calibration of the flowmeter is generally achieved in the following manner: after having correctly oriented the flowmeter in space, at least one end thereof is closed so as to ensure zero flow, then the value of a resistor connected in the branch of the Wheatstone bridge opposed to that in which the thermoresistant wire is located is varied so as to obtain in this wire a current whose magnitude is equal to a reference value, and there is then obtained a temperature of the wire adjusted to a desired constant value.

Such a flowmeter however has drawbacks as concerns its circuit and the calibration process employed. Indeed, in order to obtain a good stability of the control loop which is used jointly with the Wheatstone bridge so as to maintain the temperature of the resistant wire constant, high precision, and consequently expensive, components must be used. Further, the Wheatstone bridge comprises in one of its two input branches a variable resistance which may be formed by a potentiometer the adjustment of which is effected manually, which constitutes an operation which one would naturally try to avoid. In order to avoid such a manual adjustment there could be provided an automatic adjustment by using as the variable resistance a field effect transistor controlled by an electronic circuit, but one would then be faced with the problem of the great thermal drift of such a component.

As concerns the calibration process of known flowmeters, this process requires a prior orientation of the flowmeter in a well-determined position. This therefore implies that the apparatus is utilized by personnel particularly well-acquainted with its operation, which may not always be the case.

An object of the invention is to overcome these drawbacks by providing a flowmeter of particularly simple design whose calibration may be effected automatically.

The invention therefore provides a flowmeter having a hot thermoresistant element at constant temperature, said flowmeter comprising an amplifier having a variable gain whose input is connected to ground through a resistance of constant low value relative to the input impedance of the amplifier, the thermoresistant element being connected between the input and the output of the variable gain amplifier, and means for adjusting the value of the gain of the amplifier in such manner as to obtain the desired value of the current in the thermoresistant element corresponding to the constant temperature it is desired to obtain.

According to a further feature of the invention, the gain of the amplifier is controlled by a microprocessor which knows at each instant the value of the applied gain.

The flowmeter according to the invention affords the advantage that the calibration operation is considerably simplified and that it can be easily achieved by personnel who has not had a high level of scientific training.

Various embodiments of the present invention will now be described hereinafter by way of non-limiting examples, with reference to the accompanying drawing, in which:

FIG. 1 is an electric diagram of a flowmeter having a hot thermoresistant element at constant temperature according to the invention;

FIG. 2 is an electric diagram of an embodiment of the flowmeter.

The flowmeter having a hot thermoresistant element at constant temperature shown in FIG. 1 comprises an amplifier 1 having a variable gain which may be electronically controlled by a gain controlling circuit 2. The thermoresistant element 3, in the present instance a wire having a resistance Rf whose temperature must be maintained constant, is connected, at one of its ends A, to the output of the amplifier 1 and, at its other end B, to the input of this amplifier. The point B is moreover connected to ground through a constant resistance 4 of value R1 which is low relative to the input impedance of the variable gain amplifier 1. The voltage measured between the point B and ground C by means of a voltmeter 5, gives an indication of the measured flow.

The resistance Rf of the thermoresistant wire 3, i.e. its temperature, depends on the value of the gain G of the amplifier 1. Indeed, as Vac=(Rf+R1), I, in which I is the magnitude of the current passing through the thermoresistant wire 3, there is obtained:

$$(Rf+R1)I = R1 \cdot I$$

namely $G = 1 + (Rf/R1)$

Consequently, if the value of the gain G is maintained constant, the value of the resistance Rf of the thermoresistant wire 3 is also maintained constant.

The flowmeter according to the invention may of course be calibrated in the same way as before; in other words, with the detector obturated and suitably oriented, the value of the grain G is adjusted to obtain the the desired value of the current in the thermoresistant wire 3. However, it is always necessary to correctly orient the detector.

On the other hand, the calibrating procedure may be carried out in the following manner:

At ambient temperature Ta, the wire has such resistance Rfa that:

$$Rfa = Ro(1 + \alpha Ta)$$

in which
Ro = the resistance of the wire at 0° C.
$\alpha$ = thermal coefficient There exists therefore a minimum gain Ga in respect of which the circuit of FIG. 1 can loop, i.e. the amplifier 1 supplies current. This gives:

$$Ga = 1 + \frac{Rfa}{R1} = 1 + \frac{Ro}{R1}(1 + \alpha Ta)$$

When the thermoresistant wire 3 is brought to its operating temperature in respect of which its resistance is:

$$G = 1 + \frac{Rf}{R1} = 1 + \frac{Ro}{R1}(1 + aT)$$

The following relation is deduced:

$$G = 1 + (Ga - 1)\frac{1 + aT}{1 + aTa} \quad (I)$$

$$\frac{1 + aT}{1 + aTa}$$

being a constant term to within variations of T. It can be seen that it is possible to determine the value G of the gain to be applied by knowing the value of Ga.

In other words, the formula (I) permits the determination from the operating temperature (T) to which the thermoresistant wire 3 must be brought and from the minimum gain (Ga), of the value of the gain (G) to which the amplifier 1 must be adjusted to obtain, in the thermoresistant wire 3, a current I which results in the desired temperature T of the wire.

Consequently, the flowmeter according to the invention comprises means for determining whether the circuit is looped, i.e. whether the amplifier 1 supplies current. This means act in the circuit 2 controlling the gain which is formed by a microprocessor which knows at each instant the value of the gain G applied.

Therefore, when the calibrating instruction is given to the microprocessor 2, for example by pushing a button, the microprocessor applies a gain G=0 to the amplifier 1, then it gradually increases this gain G until the circuit loops. At this moment, the microprocessor 2 detects that the circuit is looped and it determines that the looping is achieved for a value Ga of the gain. Thenceforth, the microprocessor computes the value G by means of the formula (I) in using the previously-determined value Ga, and it applies this gain to the amplifier 1. Consequently, the thermoresistant wire carries a current I ensuring that the temperature T is maintained at the desired value. The flowmeter is now calibrated.

It can be seen that, with the foregoing calibration process, the thermoresistant wire 3 is not heated during the calibration and consequently its orientation in space does not affect the precision of this calibration.

In the embodiment of the invention shown in FIG. 2, to which the scope of the invention is not intended to be limited, the variable gain amplifier 1 is in fact constituted by an assembly of two amplifiers 7 and 8 between which there is connected a digital-analog converter 9 controlled by the microprocessor 2. The amplifier 7 has a positive input and a negative input, the positive input being connected to ground through a resistor 10 having a value of 8 kiloohms while its negative input is connected to the point B through a resistor 11 having a resistance of 10 kiloohms. The resistor 4 which is connected between the points B and C (ground) has a very low value of 20 ohms. A resistor 12 of 40 kiloohms and a capacitor 13 are connected in parallel between the negative input of the amplifier 7 and its output at which a voltage Vd appears. This voltage Vd corresponds to the voltage Vb which is amplified and inverted by the amplifier 7 having a gain equal to −4. The voltage Vd, filtered through the capacitor 13, is applied to the reference voltage input of the digital-analog converter 9 which is therefore used as a multiplier.

The digital-analog converter 9 has two outputs which are respectively connected to the negative and positive inputs of the amplifier 8. The output current of the amplifier 8 is amplified by two transistors 14 and 15 connected in cascade and the output voltage Va appears on the emitter of the transistor 15 to which the thermoresistant wire 3 is connected.

The microprocessor 2 can consequently multiply the output voltage Vd of the amplifier 7 by a coefficient between 0 and −1 and there is obtained a voltage Va at the point A which is equal to xVb, in which Vb is the voltage at the point B, and x is between 0 and 4. A capacitor 16 is connected between the negative input of the amplifier 8 and the emitter of the transistor 15 so as to filter rthe output voltage Va.

What is claimed is:

1. A flowmeter having a hot thermoresistant element at constant temperature, said thermoresistant element having an input end and an output end and comprising a variable gain amplifier and an input connected to ground through a resistor whose resistance is constant and of low value relative to the input impedance of the amplifier, the thermoresistant element being connected between the input and an output of the variable gain amplifier, means for adjusting the value of the gain of the amplifier so as to obtain the desired value of the current in the thermoresistant element corresponding to the constant temperature it is desired to obtain and means permitting determination of the gain (Ga) at which the circuit begins to loop at ambient temperature.

2. A flowmeter according to claim 1, comprising a microprocessor in combination with the amplifier for adjusting the gain of the amplifier, the microprocessor being adapted to determine at each instant the value of said gain.

3. A flowmeter according to claim 2, wherein the variable gain amplifier comprises a first amplifier, a second amplifier and a digital-analog converter which is connected to the microprocessor, said first amplifier having a first input, a second input and an output, said first input being connected to ground through a first resistor whose resistance is constant and of low value relative to the input impedance of said first amplifier, said second input being connected to the output end of said thermoresistant element through a second resistor, said output of the first amplifier being connected to a reference voltage input of the digital-analog converter which has an output connected to an input of the second amplifier, said second amplifier having an output connected to the input end of said thermoresistant element.

4. A process for calibrating a flowmeter having a hot thermoresistant element at constant temperature (T), comprising an amplifier having a variable gain and an input connected to ground through a resistor whose resistance (R1) is constant and of low value relative to the input impedance of the amplifier, the thermoresistant element being connected between the input and an output of the variable gain amplifier, said thermoresistant element having a thermal coefficient (α), and means for adjusting the value of the gain of the amplifier so as to obtain a current in the thermoresistant element corresponding to the constant temperature (T) it is desired to obtain, said process comprising the steps of determining a minimum gain (Ga) of the amplifier at ambient temperature (Ta) by increasing the gain until detection of the moment of a current delivered by said variable gain amplifier, determining the value of the gain at said moment, said gain at said moment being (Ga), and calculating the gain (G) to be applied to the flowmeter at the operating temperature (T) of the thermoresistant element according to the formula:

$$G = 1 + (Ga - 1)\frac{1 + \alpha T}{1 + \alpha Ta}$$

* * * * *